United States Patent
Tsai et al.

[11] Patent Number: 5,908,603
[45] Date of Patent: Jun. 1, 1999

[54] OZONE GENERATOR HAVING MICRO PUMP

[75] Inventors: Ming-Jye Tsai, Changhua; Shih-Che Lo, Ilan; Ray-Ten Chen; Tung-Chuan Wu, both of Hsinchu, all of Taiwan

[73] Assignee: Industrial Technology Research Institute, Hsinchu, Taiwan

[21] Appl. No.: 08/887,540

[22] Filed: Jul. 3, 1997

[51] Int. Cl.$^6$ .................................................. B01J 19/08
[52] U.S. Cl. .................. 422/186.07; 422/906; 417/413.3
[58] Field of Search ............................... 422/186.07, 906; 417/413.3

[56] References Cited

U.S. PATENT DOCUMENTS

| | | | |
|---|---|---|---|
| 4,832,918 | 5/1989 | Horikoshi et al. | 422/186.07 |
| 5,366,703 | 11/1994 | Liechti et al. | 422/186.07 |
| 5,756,054 | 5/1998 | Wong et al. | 422/186.07 |

*Primary Examiner*—Kishor Mayekar
*Attorney, Agent, or Firm*—W. Wayne Liauh

[57] ABSTRACT

An integrated ozone generator is disclosed. It includes: (a) an upper covering layer having a thin film, and a permanent magnet being installed on the thin film, the permanent magnet having a periphery which is surrounded with a coil on which a plurality of contact points are installed for inputting an oscillating signal, so as to form an electromagnetically actuating micro pump, the upper covering layer further having a hole formed on a first side of the upper covering layer and an upper thin film electrode and a discharging teethed structure installed on an inside surface of the covering layer away from the hole; and (b) a base having a groove which is connected with an inner hole of the upper covering layer to form a gas chamber, a gradually opened channel at one side of the gas chamber for inputting gas, and another gradually reducing channel at another side of the gas chamber. The base also contains a lower thin film electrode connected to the gradually reducing channel and a plurality of discharging micro tips being installed inside the base at a position corresponding to the lower thin film electrode, the lower thin film electrode being positioned opposite to the upper electrode thin film inside the upper covering layer and the discharging micro tips which are installed on either the upper thin film electrode or the lower thin film electrode, or both, to form an arc discharging structure.

8 Claims, 8 Drawing Sheets

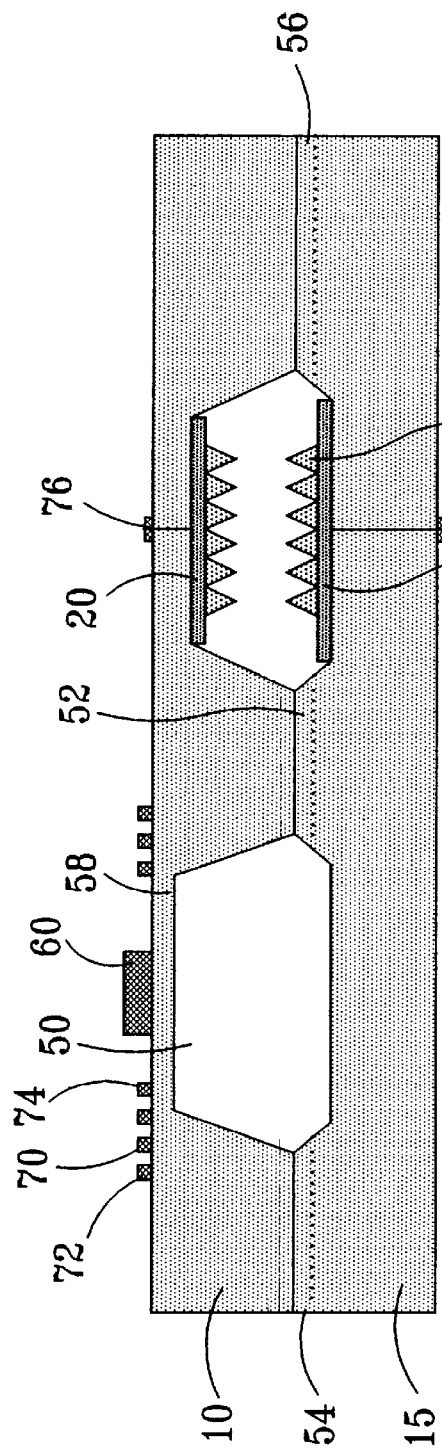
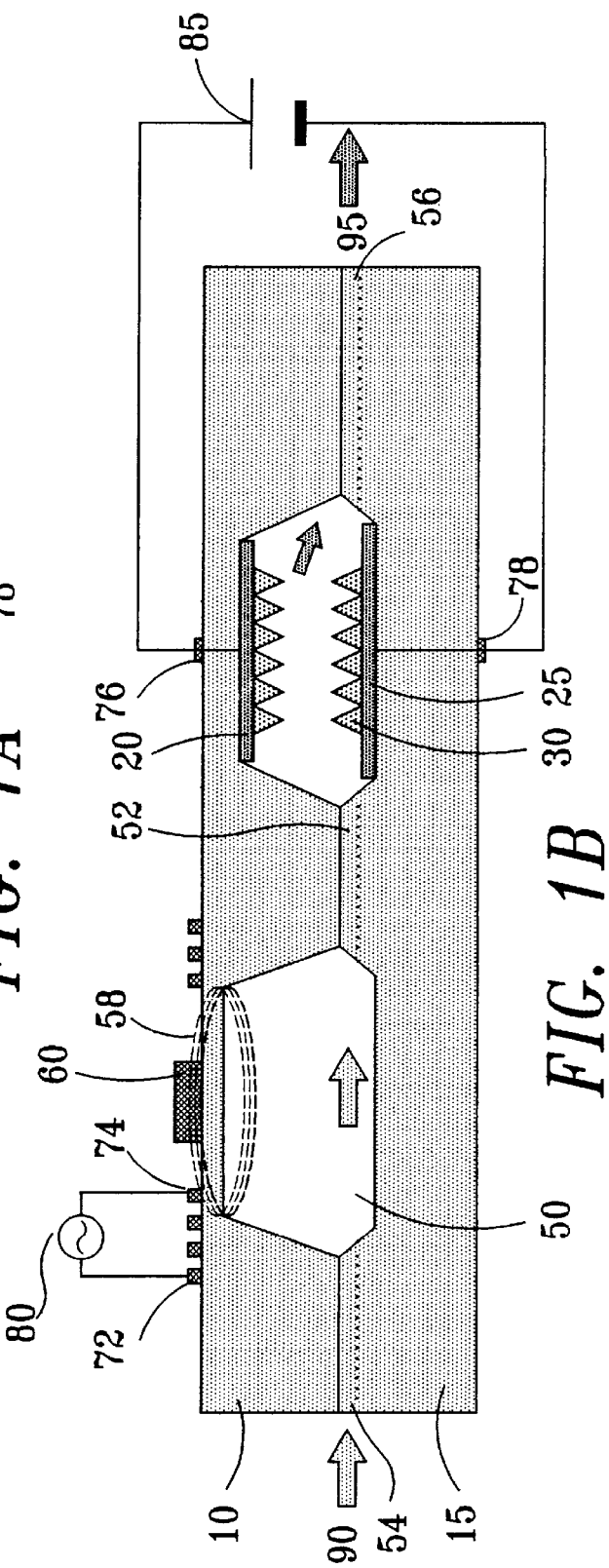
FIG. 1A
FIG. 1B

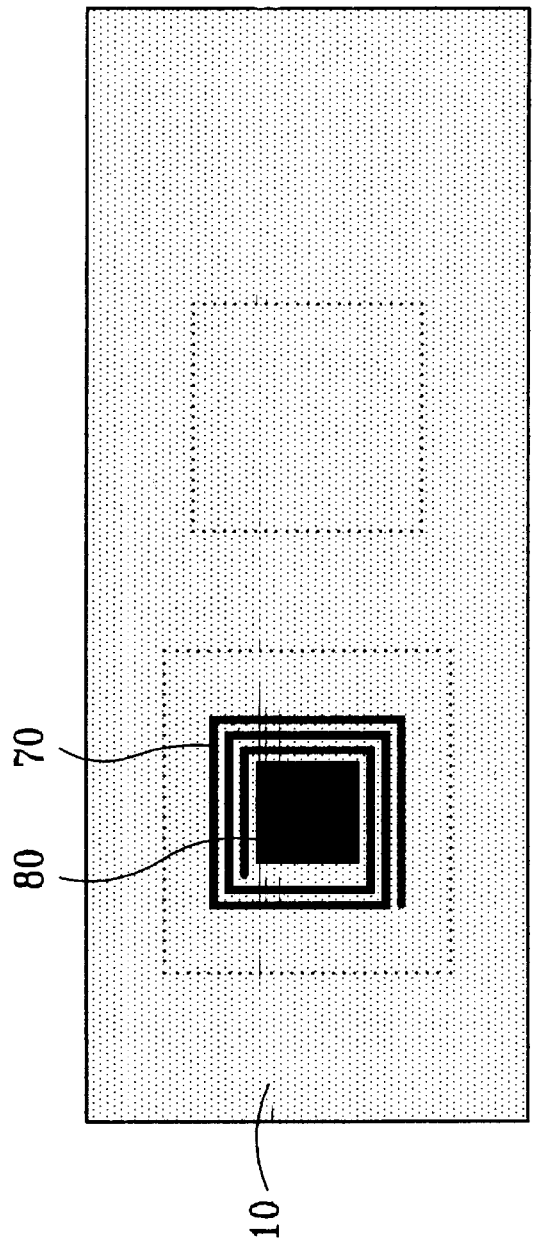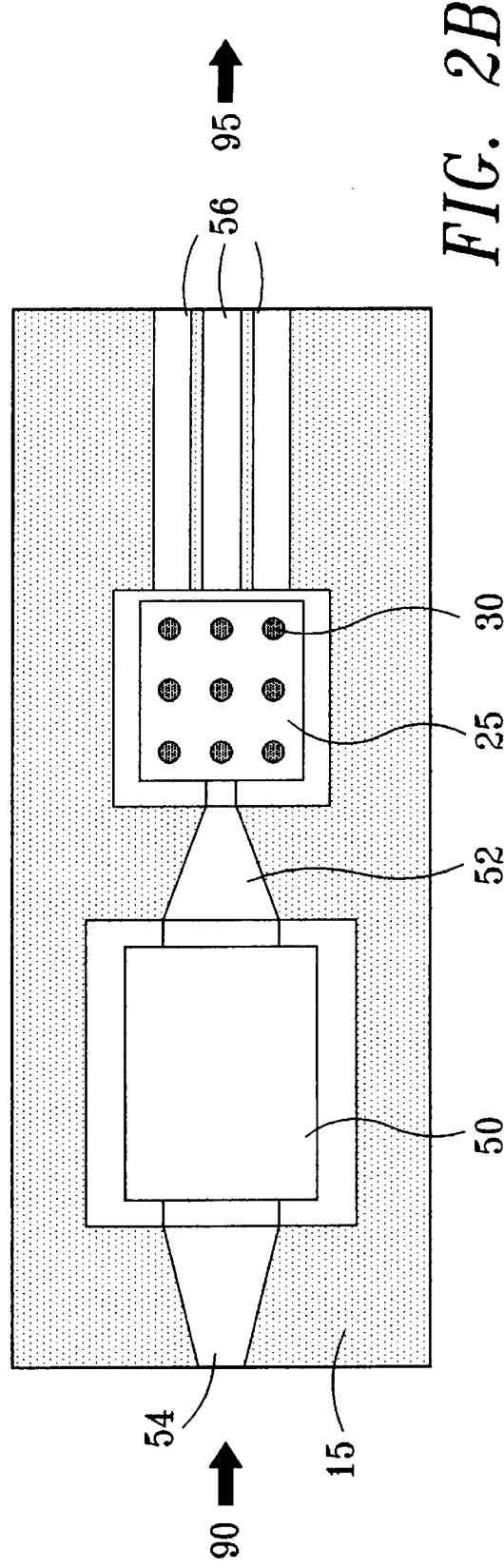

OZONE GENERATOR HAVING MICRO PUMP

BACKGROUND OF THE INVENTION

1. Field of the Invention

The present invention is related to an ozone generator, wherein a micro pump is used to compress air so that the air flow into a discharging section through a gradually reduced channel, then the oxygen contained within said compressed air is excited to form ozone gas, and then the ozone gas is further compressed to transfer to the atmosphere.

2. Description of the Prior Art

Ozone is a strong oxidizer, and it is generally used in water processing, organic composition, food sterilization, germless chamber, etc. The primary method for manufacturing ozone is by using electrolysis, ultraviolet excitation, and electric arc, wherein the electric arc method is widely used in industry and home ozone generator. By observing the thunderbolt in the nature, the oxygen in the air is discharged by said thunderbolt so to excite to become high active oxygen atom and then these oxygen atoms is combined to form ozone gas. That is: in the electric arc method, the discharging electrode is used to excite air or oxygen so to form ozone gas, and the density of said generated ozone gas is dependent on the power of discharging, the higher the generated ozone density, the larger the discharging power. Another, since the ozone gas is a strong oxidizer, if the density of said ozone is too high, it will make a harmful effect to human body, therefore, it is very important to control the density of ozone.

In summary, there are three Patent Applications about the ozone generator of electric arc method, in Taiwan Patent Application No. 8120273, a cylindrical discharging structure is disclosed; in the Taiwan Patent Application No. 82105268, a plan type discharging structure having rack is disclosed, another in Taiwan Patent Application No. 84209608, a hole plan type discharging structure having discharging pins is disclosed. From the aforementioned Patent Applications, it is appreciated that in the ozone generator with different forms, the oxygen in the air is excited by discharging, however, the discharging voltage is higher, furthermore an air compressor is used to guide external air into a discharging section, thus the module has a large volume. From above description, it is appreciated that the defects in the prior art is that it has a large volume, is not easy to be minimized and modularized, it need to have many components, and the structure thereof is also complicated.

SUMMARY OF THE INVENTION

There are different kinds of ozone generators in the prior art. However, from the above description, it is apparent that there are some defects in said ozone generator. By long period research, the inventor of the present invention has invented a brand-new structure ozone generator having a micro pump. Accordingly, the object of the present invention is to provide an ozone generator, however, instead of using air compressible or other compressible fans, in the present invention, a reciprocal micro pump is used as a power source to provide the power for absorbing and venting air. Wherein said micro pump, discharging section and gas chamber are integrated horizontally or vertically so that after integrating, said module is formed as an ozone generator. In the ozone generator, the air is flow through a gradually opening channel to a chamber, and then further through a gradually reducing channel to a discharging section. The oxygen molecule in said discharging chamber is excited to become ozone gas, and then is further released to atmosphere. By the modularized design itself, the air may input for supplying the output of ozone, thus the process is continuous, and it also has the advantage of small volume and low voltage. Said reciprocal micro pump may be a thermal actuated micro pump or a electromagnetic actuated micro pump to attain the same functions. the present invention has the follow advantages with comparing to the prior art:

1. The gas need not to be guided by a large air compressor or fans, however, a micro pump is used to provide the power for guiding air.

2. In the present invention, the ozone generator is assembled transversely by an upper layer and a lower layer so to form a discharging section and a air guiding and storing section, therefore, the ozone generator may be minimized and modularized.

3. In the present invention, the process is feasible, and the micro pump and ozone generator is shaped for a minimum volume, thus the reliability is high.

4. In the present invention, the micro pump and ozone generator is integrated vertically, thus the guiding air has a larger volume, and the micro pump and the present invention is closely positioned, thus all the guiding air is supplied for discharging to form ozone gas, thus the guiding air will not be wasted.

5. By using thin film and micro finishing technology, thus said reciprocal micro pump is used to provide air to the discharging section, it may be excited to form ozone gas repeatedly.

6. The reciprocal micro pump may be actuated by a thermal actuated type.

BRIEF DESCRIPTION OF THE DRAWINGS

The invention, as well as its many advantages, may be further understood by the following description and drawings in which:

FIG. 1A is the side view of the horizontal integrated structure of the present invention.

FIG. 1B is the side view of ozone generated flow diagram of the horizontal integrated structure of the present invention.

FIG. 2A is an elevational view of the upper covering layer of the horizontal integrated structure of the present invention.

FIG. 2B is an elevational view of the base of the horizontal integrated structure of the present invention.

DETAILED DESCRIPTION OF THE PREFERRED EMBODIMENT

Figure 3:
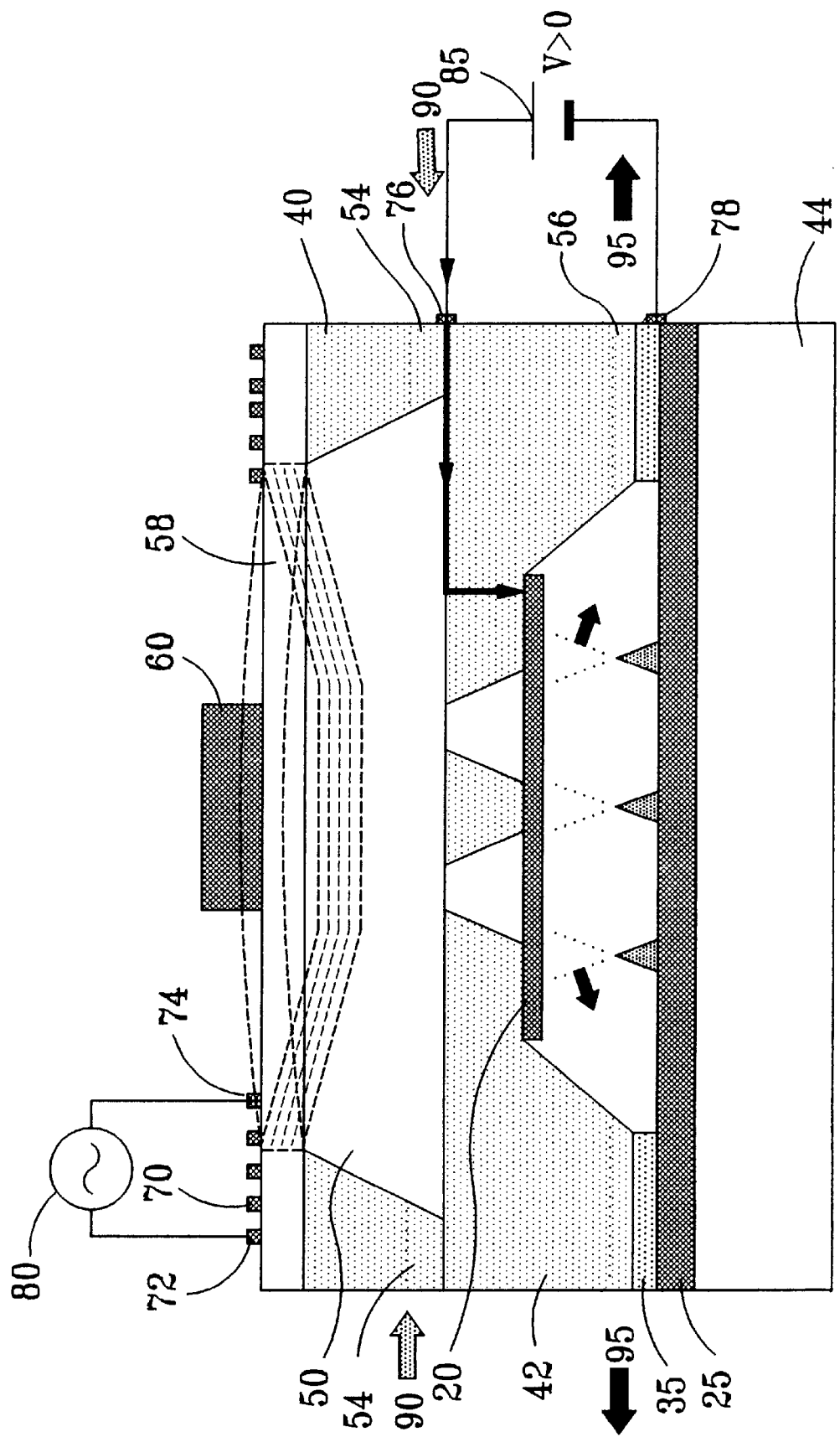
FIG. 3 is the side view of the three layer structure of the present invention.

Now referring to FIG. 1A, the horizontally integrated structure of an ozone generator having micro pump of the present invention is shown. The structure of the present invention is comprised of an electromagnetic actuating micro pump, a discharging structure, an upper layer 10, and a base 15. Now referring to FIGS. 1A, 1B and 2A, a thin film 58 is installed on the center of edge surface on the upper left of said upper covering layer 10, and a permanent magnet 60 is installed on said film 58, while in the periphery of said permanent magnet 60 is surrounded by a coil 70 on which contact points 72 and 74 are installed for inputting oscillating signal 80 so to form a structure of electromagnetic actuating micro pump. A hole is installed on the left of said upper covering layer 10 and inside the right side of said covering layer 10 is installed with an upper electrode thin film 20 and a discharging teeth potion 30. Referring to FIG. 2B, it is the elevational view of base 15, as in the Figs., the groove on the inside of the left side of said base 15 is connected with inner hole of said upper covering layer 10 so to form as a gas chamber 50 the left side of which has a gradually opened channel 54 for inputting gas 90, and the right side thereof has a gradually reducing channel 52. A lower electrode thin film 25 and discharging micro tips 30 are installed inside the right side of said base 15, which are opposite to said upper electrode thin film 20 inside said upper covering layer 10 and said discharging micro tips 30 so to form as a discharging structure. Three micro channels 56 are installed on the right side of said discharging structure (the number of said micro channels may be installed as required) for inputting said ozone gas.

Now referring to FIG. 1B, it is a flow diagram of the ozone generator of the present invention. When a oscillating signal is transmitted through the contact points 72 and 74 of said coil 70 so to induce the permanent magnet 60 on the center thereof, thus it may vibrate with said thin film 58, as the thin film 58 and said permanent magnet 60 are moved upwards, the volume of said gas chamber is expanded, and the outside gas 90 is attracted from said gradually opened channel 54 to said gas chamber 50. In the other words, as the thin film 58 and said permanent magnet 60 are moved downwards, the volume of said gas chamber is compressed, the outside gas 90 is absorbed from said reduced opened channel 54 to a discharging section. Gas is received by said discharging section by conducting of said micro pump. The voltage of said high voltage source 85 is inputted to the upper and lower electrode thin films 20 and 25 by the contact points 76 and 78. By the densely tip point discharging on the discharging micro tips 30 of the periphery of said electrode thin films 20 and 25, the gas which flows from the gas chamber 50 through said gradually reducing channel 52 will be excited so to form ozone and then said ozone is transferred to the atmosphere through said micro channel 56. The micro pump will expand and compress, alternatively, thus, the fresh air 90 will be extracted and compressed continuously. The generated ozone will be compressed so to transfer to atmosphere.

Figure 4:
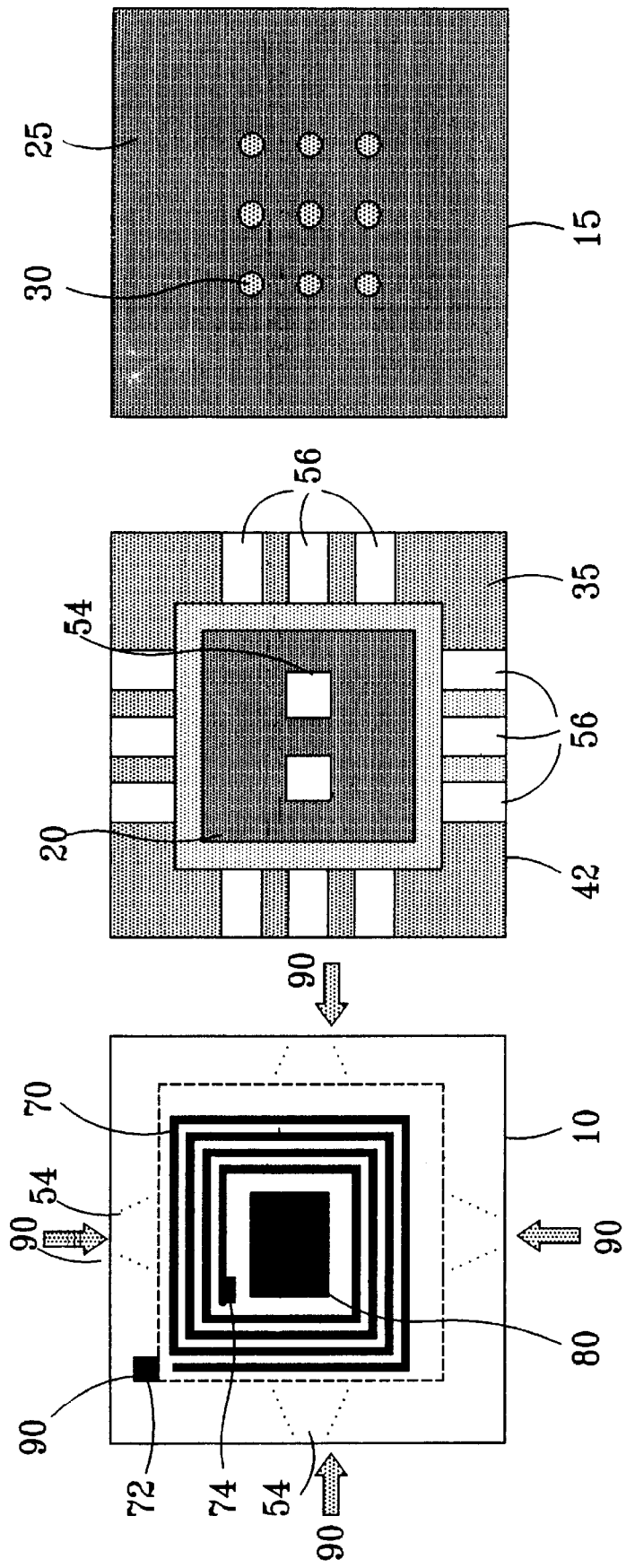
FIG. 4A is the side view of the upper covering layer of the three layer structure of the present invention.
FIG. 4B is the side view of the medium layer of the three layer structure of the present invention.
FIG. 4C is the side view of the base of the three layer structure of the present invention.

Referring to FIG. 3, it is the vertically integrated side view of the three layers of the present invention. It is apparent form said Fig. that the structure is comprised of an upper covering layer 40, a medium layer 42 and a base 44, totally, three layers. Now referring to FIGS. 4A–4C, it is the upper view of the upper covering layer of the three layer structure in the present invention, another, referring to FIG. 4, a thin film is installed on the upper edge surface of said upper covering layer 40 and a permanent magnet 60 is installed on said thin film 58, while on the periphery of said permanent magnet 60 is surrounded by a coil 70 on which contact points a72 and b74 are installed for inputting oscillating signal 80 a gas chamber 50 is installed inside said upper covering layer 40, and on the four sides of said gas chamber 50 are installed with gradually opened channels 54, respectively, for inputting gas. Now referring to FIG. 4B, it is the upper view of the medium of the three layer structure in the present invention, another, referring to FIG. 3, it is appreciated from said Figs, that two gradually opened channels are installed on the upper portion of said medium layer 42 for guiding the flowing of the gas 90 within the gas chamber 50 inside said upper covering layer 40. An upper electrode thin film is installed below said gradually opening channel 54. The air flowing from said medium layer is placed below the upper electrode thin film 20 and may be discharged so that the ozone is formed. An insulation layer is installed between the medium layer 42 and the base 44 and all sides of said insulating layer 35 are installed with three micro channels, respectively, thus the ozone made from excitation may be discharged to the external from these channels. Now referring to FIG. 4C, it is appreciated from said Figure, the base 44 is installed on the lower electrode thin film 25 and the upper end of said lower electrode thin film 25 is extended to the outside of said discharging micro tips 30 for guiding the inlet gas 90, and then the air may be excited to become ozone.

When the oscillating signal 80 is transmitted through the contacting points a72 and b74 of said coil 70, the permanent magnet 60 and the thin film 58 are vibrated upwards and downwards repeatedly. As they are moved upwards, the volume within said gas chamber is increased, then the air is guided into the gas chamber 50 of said upper covering layer 40 through the gradually opening channel 54 on the four sides of said gas chamber 50. On the other hand, as they are moved downwards, the volume within said gas chamber is compressed, then the air is guided into a discharging section 40 through the gradually opening channel 54 of medium layer 42. By inducing high voltage source 85 to contact points 76 and 78, the discharging micro tips 30 on the electrode thin film 20 installed on said medium layer 42 and the lower electrode thin film 25 on the upper end of said base 44 are discharged to excite the inlet gas 90 so to form ozone gas 95, and then this ozone gas 95 is transferred to the atmosphere through the micro channel 56 of the medium layer 42.

The micro pump will expand and compress, alternatively, thus, the fresh air 90 will be extracted and compressed continuously. The generated ozone will be compressed so to transfer to atmosphere.

By the matching of gradually opening channel 54 and the gradually reducing channel 52, the gas 90 which has not be excited to form ozone gas 95 may be extracted to said discharging section again, therefore, the manufacturing efficiency of said ozone gas is increased.

The speed for producing ozone is controlled by the upper and lower electrode thin films 20 and 25 to match with the micro pump for transferring gas 90.

Now referring to FIGS. 1A–1B and FIGS. 2A–2B, if the present invention is assembled horizontally, then all components may be assembled on a chip easily, and the manufacturing cost is lowered and the volume will become compact, finally it may be modularized for manufacturing. Referring to FIGS. 3 and 4A–4C, if the present invention is assembled vertically, the volume of extracted gas is larger, and the direction for introducing the gas is directly faced to the discharging micro tips 30, therefore, the discharging efficiency is improved.

Another, in manufacturing, the coil 70 and leading line of power source are manufactured on a chip by deposition and etching so to match the requirement of reducing the volume of module.

Figure 5:
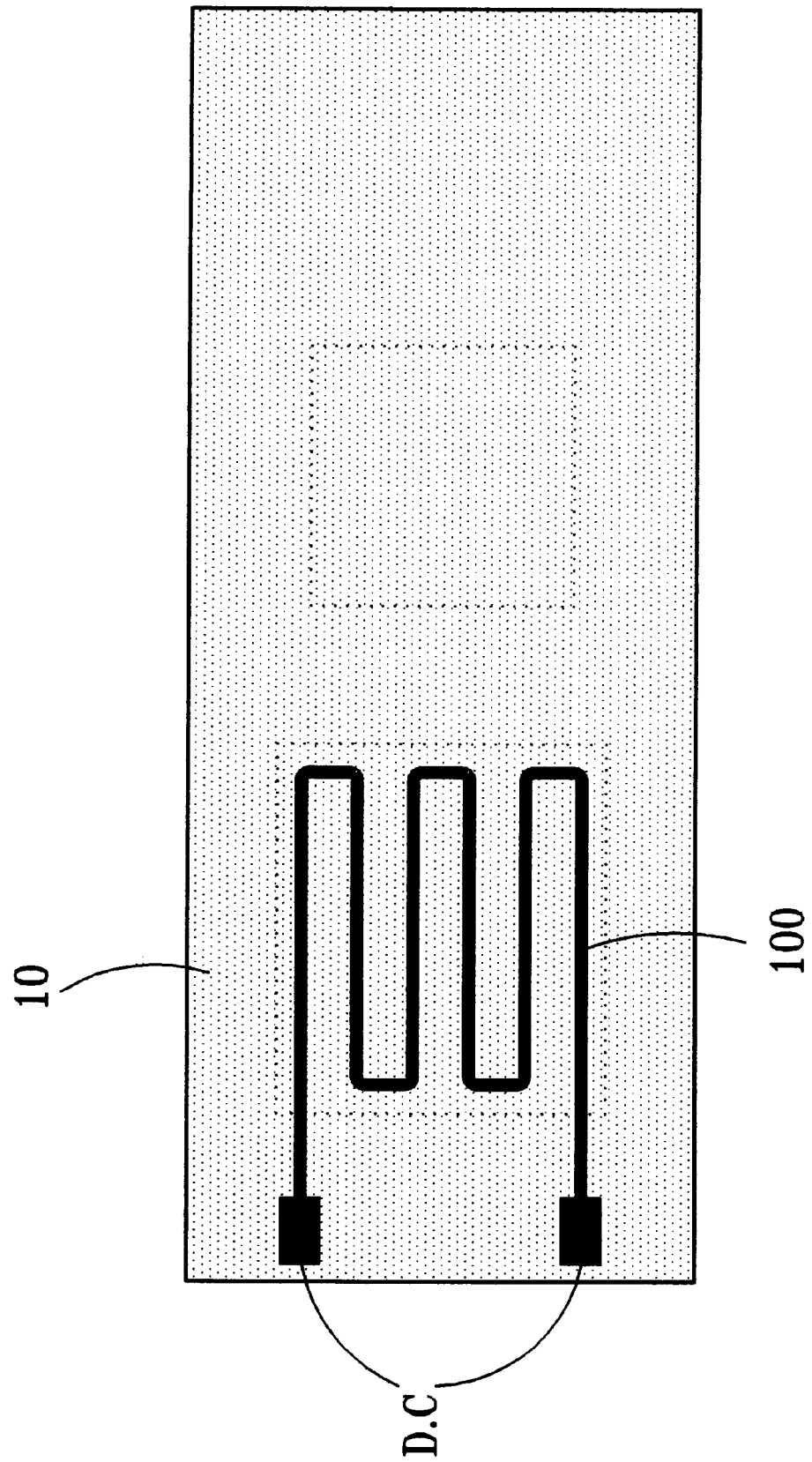
FIG. 5 shows another schematic embodiment of the micro pump used in the horizontally integrated structure of the present invention.
Figure 6:
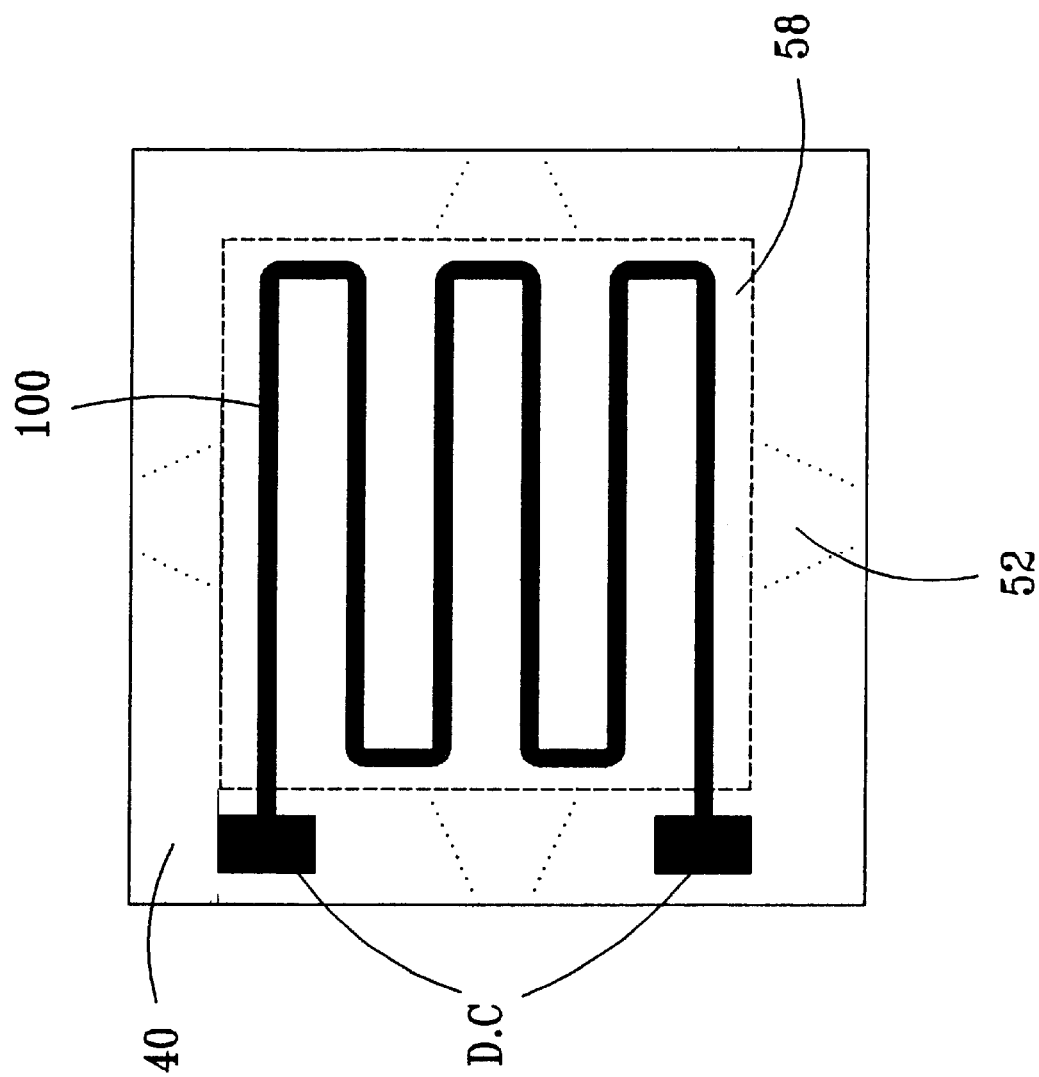
FIG. 6 shows another schematic embodiment of the micro pump used in the vertically integrated structure of the present invention.
Figure 7A:
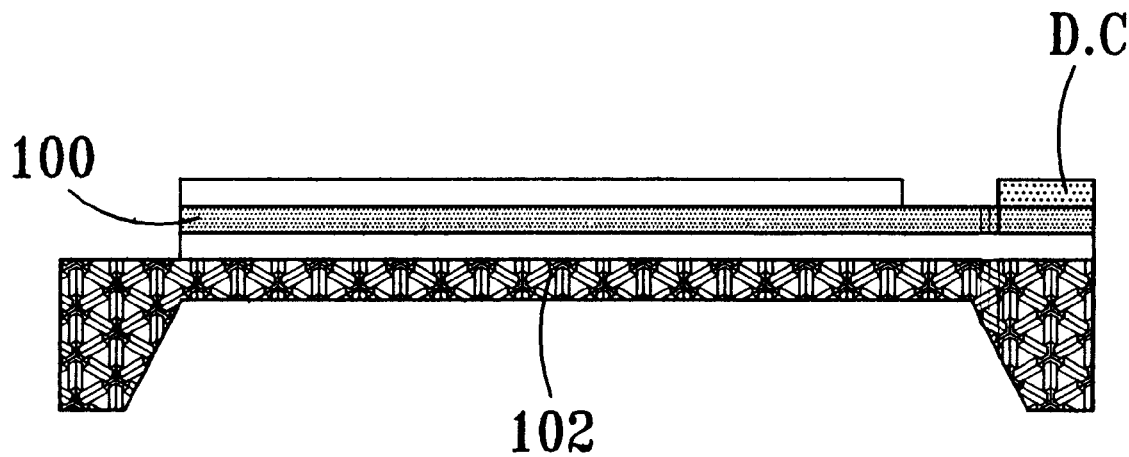
FIG. 7A is a schematic view of the thermal deformation form of a thermal actuated micro pump before receiving signals.
Figure 7B:
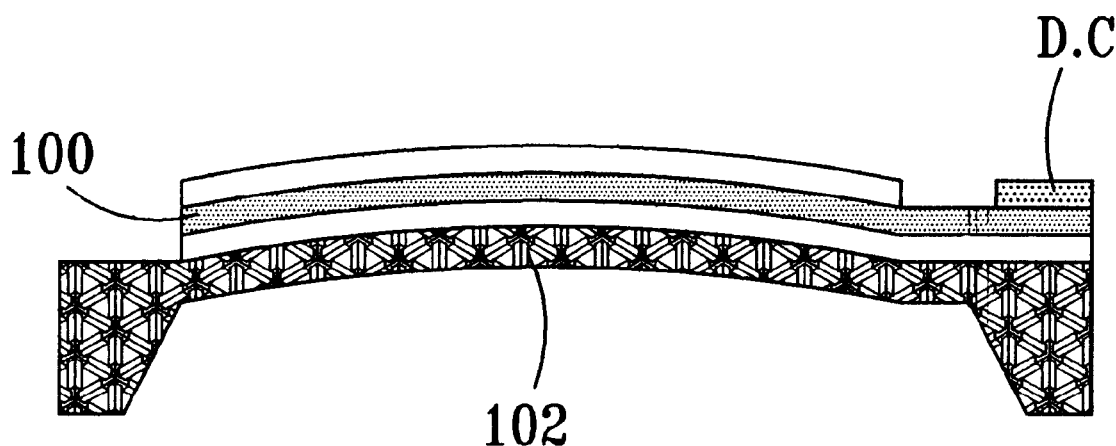
FIG. 7B is a schematic view of the thermal deformation form of a thermal actuated micro pump after receiving signals.
Figure 8A:
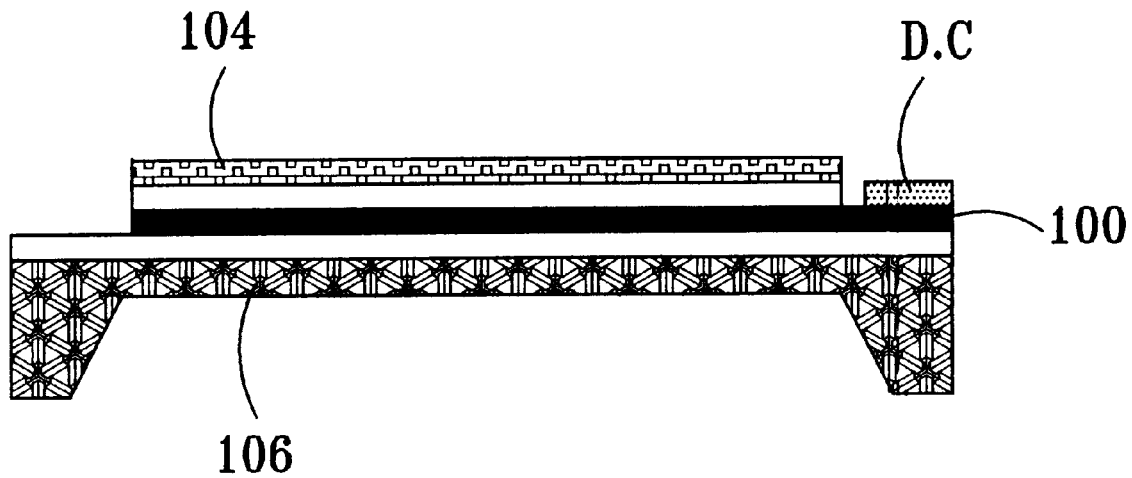
FIG. 8A is a schematic view of the double metal form of a thermal actuated micro pump before receiving signals.
Figure 8B:
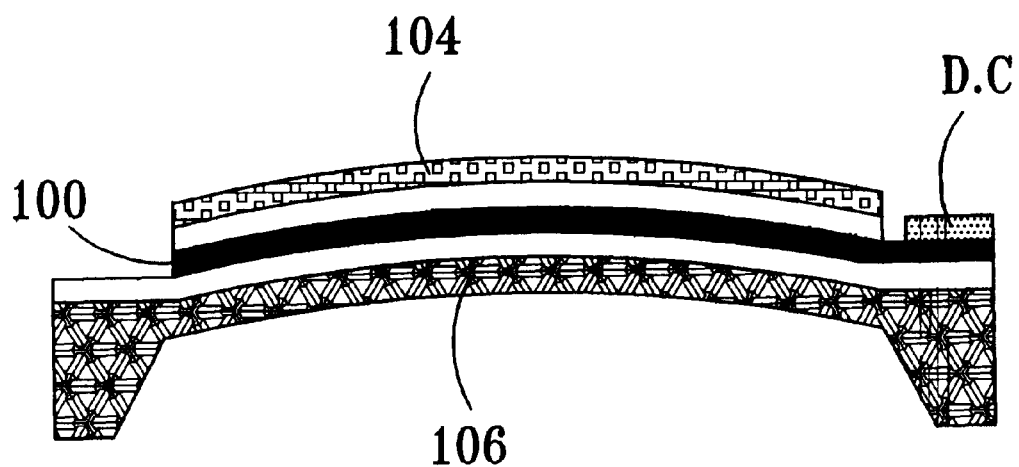
FIG. 8B is a schematic view of the double metal form of a thermal actuated micro pump after receiving signals.

Further embodiment for applying micro pump is shown in FIGS. 5 and 6, the matching of coil 70 and permanent magnet 60 is used in said micro pump, thus an oscillating action is generated and the functions of absorbing and venting gas are presented; while in this embodiment, the thermal actuated micro pump is adapted, wherein a thermal deformation or double metal layer methods are used (referring to FIGS. 7 and 8) with a heater 100 to attain the objects of absorbing and venting air. A D. C. direct current is modulated to become an impulse signal and then this signal is transferred to the heater 100. After the heater has received said signal, the temperature of said heater is variable depending on said signal. In using said thermal deformation method, as the temperature is increased, the thin film 102 under the heater 100 is thermally bent, if the temperature is reduced, then the thin film will restore to the original position. Another, in the double metal methods (metal a104 and metal b106), the metal films (metal a104 and metal b106) with different expansion coefficients on the upper and lower ends is thermally deformed, similarly, when the temperature is reduced, the double metal films (metal a104 and metal b106) will restore to the original shape. Since the signal is variable continuously, said actuating element will deform and restore continuously, thus the absorbing and venting action will sustained so to attain a predetermined effect.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

DESCRIPTION FOR THE NUMBERS IN FIGS.

| 10 | upper covering layer | 60 | magnet |
|----|---------------------|----|--------|
| 15 | base | 70 | coil |
| 20 | upper electrode thin film | 72 | contacting point a |
| 25 | lower electrode thin film | 74 | contacting point |
| 30 | discharging micro tips | 76 | contacting point |
| 35 | insulator | 78 | contacting point |
| 40 | upper covering layer | 80 | oscillating signal |
| 42 | medium layer | 85 | high voltage source |
| 44 | base | 90 | gas |
| 50 | gas chamber | 95 | ozone |
| 52 | gradually reducing channel | 100 | heater |
|  | | 102 | thin film |
| 54 | gradually opening channel | 104 | metal a |
|  | | 106 | metal b |
| 56 | micro channel | | |
| 58 | thin film | | |

What is claimed is:

1. A horizontally integrated ozone generator comprising:
an upper covering layer having an electromagnetically actuating micro pump, said electromagnetically actuating micro pump comprising a thin film and a permanent magnet being installed on said thin film, said permanent magnet having a periphery which is surrounded with a coil on which a plurality of contact points are provided for inputting an oscillating signal, said upper covering layer further having a hole and an upper thin film electrode, wherein said hole is formed on one side of said upper covering layer and said upper thin film electrode is formed on an inside surface of said upper covering layer on an opposite of said hole; and a base having a groove, a gradually opened channel and a gradually reducing channel, wherein said groove of said base is connected with said hole of said upper covering layer to form a gas chamber, said gradually opened channel is formed at one side of said gas chamber for inputting gas, and said gradually reducing channel is formed at another side of said gas chamber;

said base further having a lower thin film electrode connected to one end of said gradually reducing channel and at least one micro channel disposed at another end of said gradually opened channel in said base for outputting an ozone gas, said lower thin film electrode being positioned opposite to said upper electrode thin film of said upper covering layer;

said ozone generator further comprising a plurality of discharging micro tips which are installed on either said upper thin film electrode or said lower thin film electrode or both, to form an arc discharging structure;

wherein said ozone generator is assembled such that air is introduced into said gas chamber by said electromagnetically actuating micro pump, then to said arc discharging structure, where an oxygen molecule is excited to form an active oxygen atom, which is combined with other oxygen atoms to form an ozone gas, and then said ozone gas is transferred to the atmosphere through said micro channel.

2. The horizontally integrated ozone generator as recited in claim 1, wherein said electromagnetically actuated micro pump and said arc discharging structure are assembled on a single computer chip.

3. The horizontally integrated ozone generator as recited in claim 1, wherein said micro pump is structured to move forwards and backwards, repeatedly, thus the input of gas and output of ozone will be performed continuously.

4. The horizontally integrated ozone generator as recited in claim 1, which further comprises means to control a voltage applied to said thin film electrodes to match a gas volume introduced by said micro pump.

5. A vertically integrated ozone generator comprising:
an upper covering layer having an electromagnetically actuating micro pump, said electromagnetically actuating pump comprising a thin film, and a permanent magnet being installed on said thin film, said permanent magnet having a periphery surrounded with a coil on which a plurality of contact points are provided for inputting an oscillating signal, said upper covering layer further having a gas chamber being installed inside said upper covering layer, and a plurality of first gradually opened channels on multiple sides of said gas chamber, respectively, for inputting an oxygen gas;

a middle layer having an upper portion with a second gradually opened channel, an upper thin film electrode below said second gradually opening channel, and a plurality of micro channels for discharging ozone gas to be formed;

a base having a lower thin film electrode disposed vertically opposing said upper thin film electrode of said middle layer; and a plurality of discharging micro tips formed either on said lower thin film electrode, or on said upper thin film electrode, or on both said lower and upper thin film electrodes to form an arc discharging structure by which said oxygen gas can be excited to become an ozone gas;

wherein said ozone generator is assembled such that air is introduced into said gas chamber by said electromagnetically actuating micro pump, then to said arc discharging structure, where an oxygen molecule is excited to form an active oxygen atom, which is combined with other oxygen atoms to form an ozone gas, and then said ozone gas is transferred to the atmosphere through said micro channel.

6. The vertically integrated ozone generator as recited in claim 5, wherein electromagnetically actuated micro pump and said arc discharging structure are assembled vertically to absorb a large quantity of gas.

7. The vertically integrated ozone generator as recited in claim 5, wherein said micro pump is structured to move forwards and backwards, repeatedly, for guiding the gas flow, thus the input of gas and output of ozone will be performed continuously.

8. The vertically integrated ozone generator as recited in claim 5, which further comprises means to control a voltage applied to said thin film electrodes to match a gas volume introduced by said micro pump.

* * * * *